July 13, 1926.

D. B. GOSS 1,592,200

HEADLIGHT ATTACHMENT

Filed Sept. 3, 1925

Inventor
Daniel B. Goss
By _____ Attorney

Patented July 13, 1926.

1,592,200

UNITED STATES PATENT OFFICE.

DANIEL B. GOSS, OF CUYAHOGA FALLS, OHIO.

HEADLIGHT ATTACHMENT.

Application filed September 3, 1925. Serial No. 54,251.

This invention relates to attachments for automobile headlights, especially, and has for its object to provide an improved device for indicating to the driver of the automobile whether the headlight is lighted or not, in such manner that the driver can tell conditions from his seat in the car.

In view of the existing regulations against driving without headlights it is desirable that the driver be able to tell at all times whether the headlight is lighted, because it sometimes happens that a bulb will fail and the condition will be unknown to the driver.

For the purpose indicated, I provide an attachment consisting of a small clip which is fixed on the rim which holds the lens of the headlight, and this clip has a projecting tongue which extends beyond the rim and which, when the lamp is lighted, will reflect the light so that it can be seen from the rear, thereby indicating to the driver that the lamp is lighted.

Figure 1:
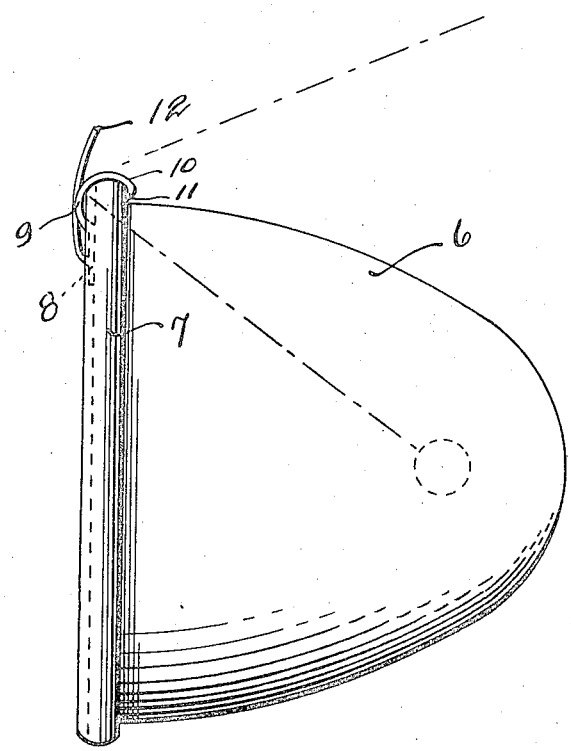
Figure 2:
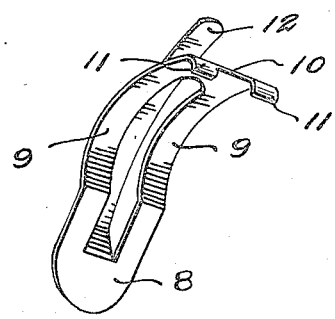

The invention will be understood from the following description and the accompanying drawings in which Fig. 1 is a side elevation of a headlight with the attachment applied. Fig. 2 is a perspective view of the device detached.

In the drawings, 6 indicates the casing of a headlight and 7 the usual rim applied to the front thereof to hold the lens in place.

The attachment consists of a piece of spring sheet metal having a lower portion 8 which when the device is applied will press against the outside of the lens within the rim, and this lower part 8 is connected by two spring arms 9 with a top part 10 which is provided at its corners with a pair of hooks 11 adapted to be engaged under the rear edge of the rim 7. The arms 9 are curved or bowed so that when the device is applied to a headlight the clip is under tension with a spring action which holds the hooks 11 engaged under the rim and the lower part 8 pressed against the lens within or below the inner edge of the rim. Also, the clip is provided with an upstanding curved tongue or finger 12, the upper end of which projects above the portion 10 of the clip and consequently projects beyond the outer circumference of the rim, and this finger is curved or disposed at such an angle that will reflect light backwards, whereby the projecting end of the finger will be visible from the rear.

The clip and finger are made of a single piece of sheet metal, the finger being stamped out of the piece and bent up to leave an opening between the arms 9. When the bulb is lighted, the light passes thru this opening adjacent the rim of the headlight and thus shines on the projecting end of the finger, which can thus be seen from the rear as a light or illuminated spot, thus indicating that the lamp is burning.

The device may be made of bright metal, or the end of finger 12 may be enameled white on the rear surface, and in either event a bright or white light will show, so that it can be seen by the driver.

The shape and proportions of the clip can be varied to suit the rims of different types of headlights, and the device can be modified in other ways, within the scope of the invention.

I claim:

1. An attachment for headlights comprising a spring clip having a lower end portion adapted to press against the headlight lens and a pair of curved spring arms projecting upwardly at opposite sides of said end portion, each arm having a hook at its upper end engageable under the rear edge of the headlight rim, and also having a finger projecting upwardly between said arms and beyond the rim so that it may be seen from the rear and in position to be illuminated by the headlight.

2. An attachment for headlights consisting of a piece of sheet metal bent to form a spring clip, with a lower end portion adapted to press against the headlight lens and a pair of bowed spring arms projecting upwardly and engaging under the rear edge of the rim of the headlight, and held thereto by the resiliency of the arms, and having a finger struck up from the sheet metal between said arms and projecting outwardly beyond the rim of the headlight and adapted to be seen from the rear, said finger being in position to be illuminated by the headlight.

In testimony whereof, I affix my signature.

DANIEL B. GOSS.